United States Patent
Wen et al.

(10) Patent No.: US 9,489,311 B2
(45) Date of Patent: Nov. 8, 2016

(54) SYSTEMS AND METHODS FOR CACHE MANAGEMENT FOR UNIVERSAL SERIAL BUS SYSTEMS

(71) Applicant: Marvell World Trade Ltd., St. Michael (BB)

(72) Inventors: Xingzhi Wen, Fremont, CA (US); Yu Hong, Shanghai (CN); Hefei Zhu, Shanghai (CN); Qunzhao Tian, Shanghai (CN); Jeanne Q. Cai, Fremont, CA (US); Shaori Guo, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 62 days.

(21) Appl. No.: 14/297,793

(22) Filed: Jun. 6, 2014

(65) Prior Publication Data
US 2014/0365731 A1  Dec. 11, 2014

Related U.S. Application Data

(60) Provisional application No. 61/832,207, filed on Jun. 7, 2013.

(51) Int. Cl.
*G06F 12/00* (2006.01)
*G06F 12/08* (2016.01)

(52) U.S. Cl.
CPC ....... *G06F 12/0868* (2013.01); *G06F 12/0862* (2013.01); *G06F 2212/2146* (2013.01)

(58) Field of Classification Search
CPC ............. G06F 12/12; G06F 12/0871; G06F 2212/69; G06F 12/128; G06F 12/0868; G06F 12/0862; G06F 12/2146
USPC .................................. 711/133, 144, 156, 159
See application file for complete search history.

(56) References Cited

U.S. PATENT DOCUMENTS

| | | |
|---|---|---|
| 7,480,739 B1 | 1/2009 | Berendsen |
| 2001/0001873 A1 | 5/2001 | Wickeraad et al. |
| 2006/0143333 A1 | 6/2006 | Minturn et al. |
| 2011/0066812 A1 | 3/2011 | Qin et al. |
| 2013/0185517 A1* | 7/2013 | Elboim ............... G06F 13/4027 711/137 |

OTHER PUBLICATIONS

International Search Report and Written Opinion issued Mar. 6, 2015 in related/corresponding PCT Patent Appl. No. PCT/IB2014/002123, which was filed Jun. 6, 2014.

* cited by examiner

*Primary Examiner* — Jasmine Song

(57) ABSTRACT

Systems and methods are provided for cache management. An example system includes a cache and a cache-management component. The cache includes a plurality of cache lines corresponding to a plurality of device endpoints, a device endpoint including a portion of a universal-serial-bus (USB) device. The cache-management component is configured to receive first transfer request blocks (TRBs) for data transfer involving a first device endpoint and determine whether a cache line in the cache is assigned to the first device endpoint. The cache-management component is further configured to, in response to no cache line in the cache being assigned to the first device endpoint, determine whether the cache includes an empty cache line that contains no valid TRBs, and in response to the cache including an empty cache line, assign the empty cache line to the first device endpoint and store the first TRBs to the empty cache line.

18 Claims, 9 Drawing Sheets

SYSTEMS AND METHODS FOR CACHE MANAGEMENT FOR UNIVERSAL SERIAL BUS SYSTEMS

CROSS-REFERENCE TO RELATED APPLICATIONS

This disclosure claims priority to and benefit from U.S. Provisional Patent Application No. 61/832,207, filed on Jun. 7, 2013, the entirety of which is incorporated herein by reference.

FIELD

The technology described in this patent document relates generally to storage medium and more particularly to cache management.

BACKGROUND

Universal Serial Bus (USB) widely used for data transfer between a host and a peripheral device (i.e., a USB device) In a USB system, the data transfer between the host and the peripheral device is controlled by a host controller, and the communication between the host controller and the host is specified in a host controller interface (HCI), e.g., "eXtensible Host Controller Interface for Universal Serial Bus (xHCI)."

Usually, the host controller executes USB operations to move data between host memory and device endpoints, where each device endpoint corresponds to a uniquely addressable portion of a USB device that is the source or sink of data in a communication flow between the host and the USB device. The host controller may use certain data structures, such as transfer request blocks (TRBs), for USB operations. For example, transfers to and from a device endpoint of a USB device are defined using a transfer descriptor (TD) which includes one or more TRBs. TDs are often managed through one or more transfer rings (i.e., circular queues of TDs) that reside in the host memory, and each transfer ring corresponds to an active device endpoint of a USB device. FIG. 1 depicts an example transfer ring that includes eight TRBs. Command rings and event rings that include a number of TRBs may also be used by the host controller for USB operations.

SUMMARY

In accordance with the teachings described herein, systems and methods are provided for cache management. An example system includes a cache and a cache-management component. The cache includes a plurality of cache lines corresponding to a plurality of device endpoints, a device endpoint including a portion of a universal-serial-bus (USB) device. The cache-management component is configured to receive one or more first transfer request blocks (TRBs) for data transfer involving a first device endpoint and determine whether a cache line in the cache is assigned to the first device endpoint. The cache-management component is further configured to, in response to no cache line in the cache being assigned to the first device endpoint, determine whether the cache includes an empty cache line that contains no valid TRBs, and in response to the cache including an empty cache line, assign the empty cache line to the first device endpoint and store the one or more first TRBs to the empty cache line. In addition, the cache-management component is configured to, in response to the cache not including an empty cache line, assign a predetermined cache line to the first device endpoint and store the one or more first TRBs to the predetermined cache line.

In one embodiment, a method is provided for cache management. One or more first transfer request blocks (TRBs) for data transfer involving a first device endpoint are received, the first device endpoint including a portion of a first universal-serial-bus (USB) device. Whether a cache line in a cache is assigned to the first device endpoint is determined, the cache including a plurality of cache lines corresponding to a plurality of device endpoints. In response to no cache line being assigned to the first device endpoint, whether the cache includes an empty cache line that contains no valid TRBs is determined. In response to the cache including an empty cache line, the empty cache line is assigned to the first device endpoint, and the one or more first TRBs are stored to the empty cache line. In response to the cache not including an empty cache line, a predetermined cache line is assigned to the first device endpoint, and the one or more first TRBs are stored to the predetermined cache line.

In another embodiment, a non-transitory computer readable storage medium includes programming instructions for cache management. The programming instructions are configured to cause one or more data processors to execute certain operations. One or more first transfer request blocks (TRBs) for data transfer involving a first device endpoint are received, the first device endpoint including a portion of a first universal-serial-bus (USB) device. Whether a cache line in a cache is assigned to the first device endpoint is determined, the cache including a plurality of cache lines corresponding to a plurality of device endpoints. In response to no cache line being assigned to the first device endpoint, whether the cache includes an empty cache line that contains no valid TRBs is determined. In response to the cache including an empty cache line, the empty cache line is assigned to the first device endpoint, and the one or more first TRBs are stored to the empty cache line. In response to the cache not including an empty cache line, a predetermined cache line is assigned to the first device endpoint, and the one or more first TRBs are stored to the predetermined cache line.

DETAILED DESCRIPTION

In a USB system, a host controller often reads TRBs directly from host memory for data transfer between the host and a device endpoint. Latency of host memory access (e.g., tens of microseconds to a few milliseconds) usually negatively affects the system performance. A cache with shorter access latency can be used to pre-fetch and store a number of TRBs from the host memory. As such, the host controller may read a TRB directly from the cache, instead of the host memory, to improve the system performance. However, the volume of a cache is often limited, while a large number of rings (e.g., transfer rings) may exist in the host memory. Thus, a cache-management mechanism may be needed to effectively use the cache for data transfer associated with the large number of rings.

Figure 1:
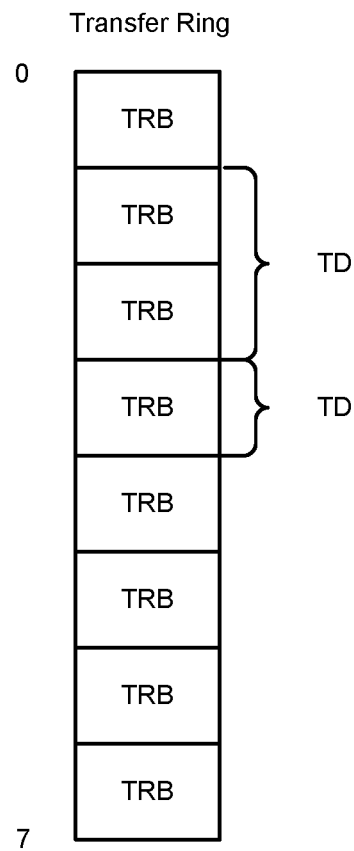
FIG. 1 depicts an example transfer ring that includes eight TRBs.
Figure 2:
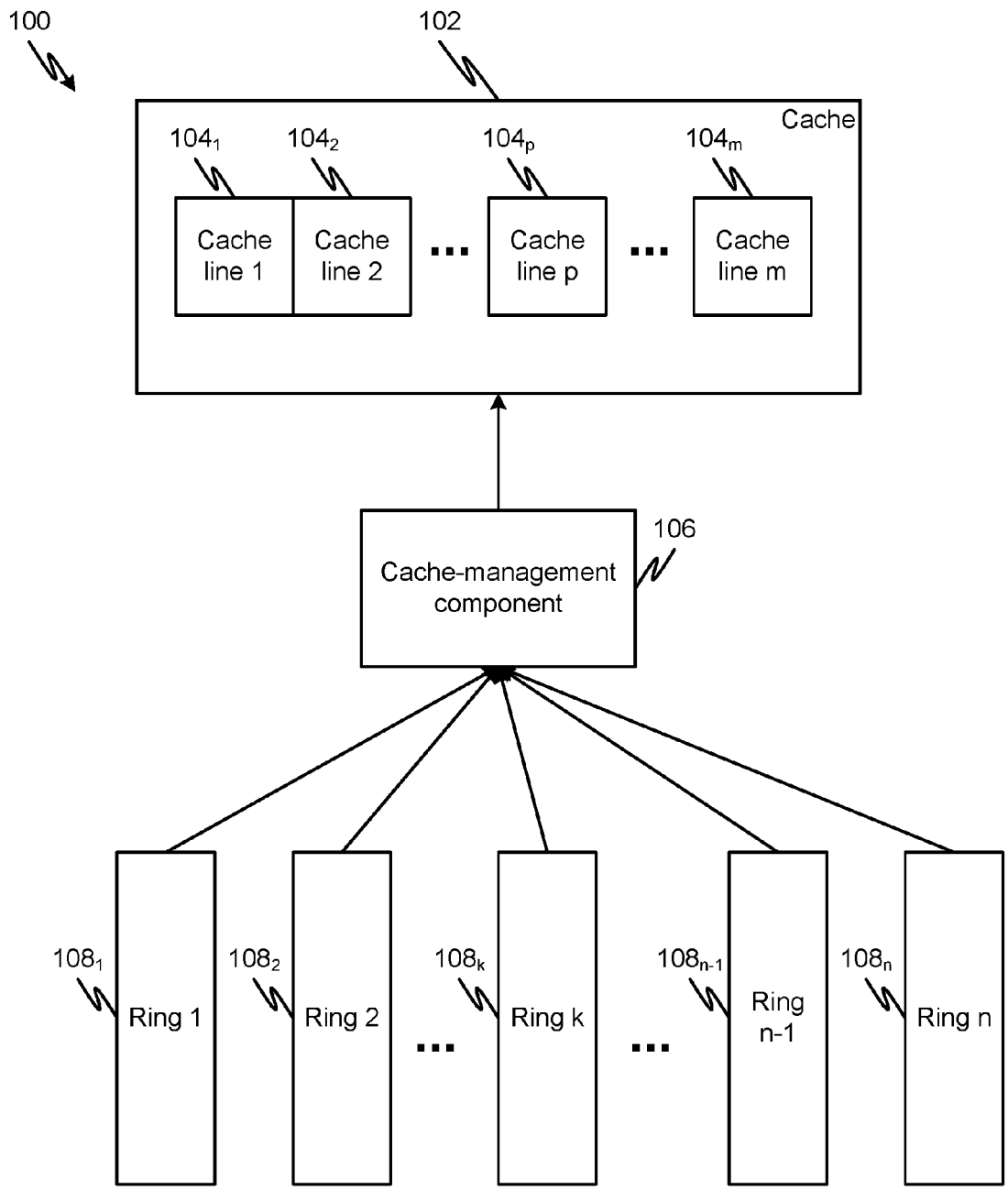
FIG. 2 depicts an example TRB cache system.

FIG. 2 depicts an example TRB cache system. As shown in FIG. 2, the TRB cache system 100 implements a cache 102 that includes a number of cache lines $104_1$, $104_2$, ..., and $104_m$ (m is a positive integer). A cache-management component 106 pre-fetches one or more TRBs from a particular ring $108_k$ (n≥k≥1), determines a cache line for the ring $108_k$ based on a cache-management algorithm, and stores the pre-fetched TRBs to the determined cache line.

Specifically, each of the rings $108_1$, $108_2$, ..., and $108_n$ corresponds to a device endpoint of a USB device. The cache-management component 106 pre-fetches one or more TRBs (e.g., a TD) from the ring $108_k$ that corresponds to a particular device endpoint. For example, a TRB is constructed in memory to transfer a single physically contiguous block of data between host memory and a host controller (not shown in FIG. 2). A TRB may include 4 double words or 16 bytes and contain a data buffer pointer, a size of the data buffer and control information. For simple single-buffer operations, a single TRB corresponds to a TD, and for large multi-buffer operations, multiple TRBs may be chained to form a complex TD. For example, a plurality of rings may correspond to different device endpoints of a single USB device.

Figure 3:
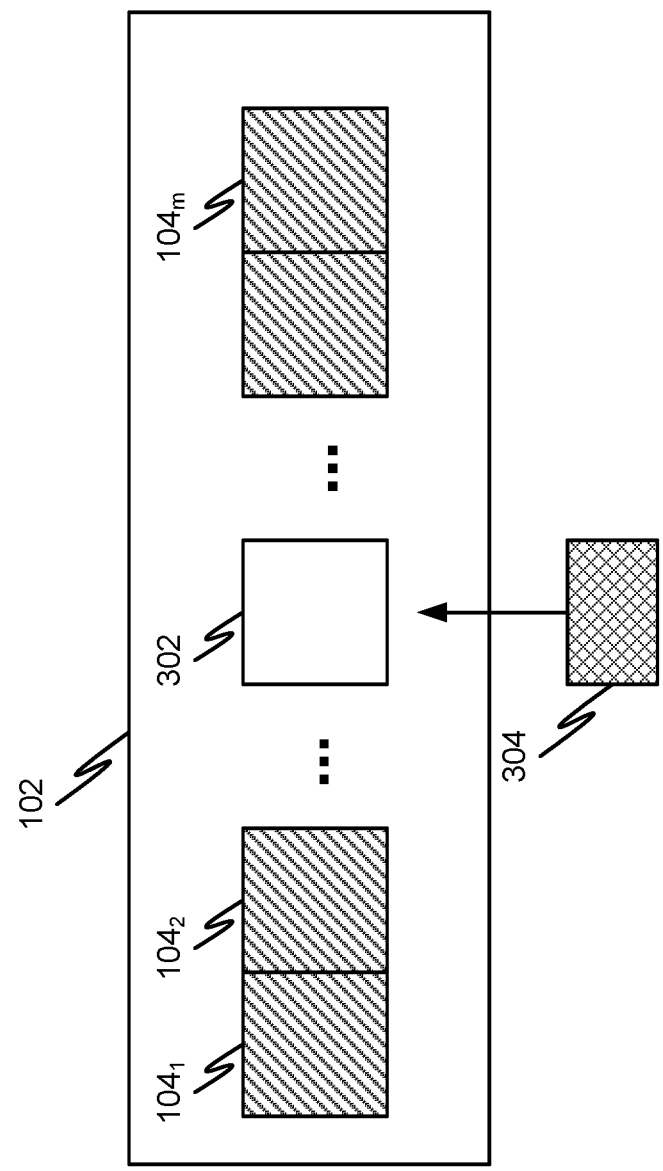
FIG. 3-FIG. 5 depict example diagrams showing cache-management mechanisms.
Figure 4:
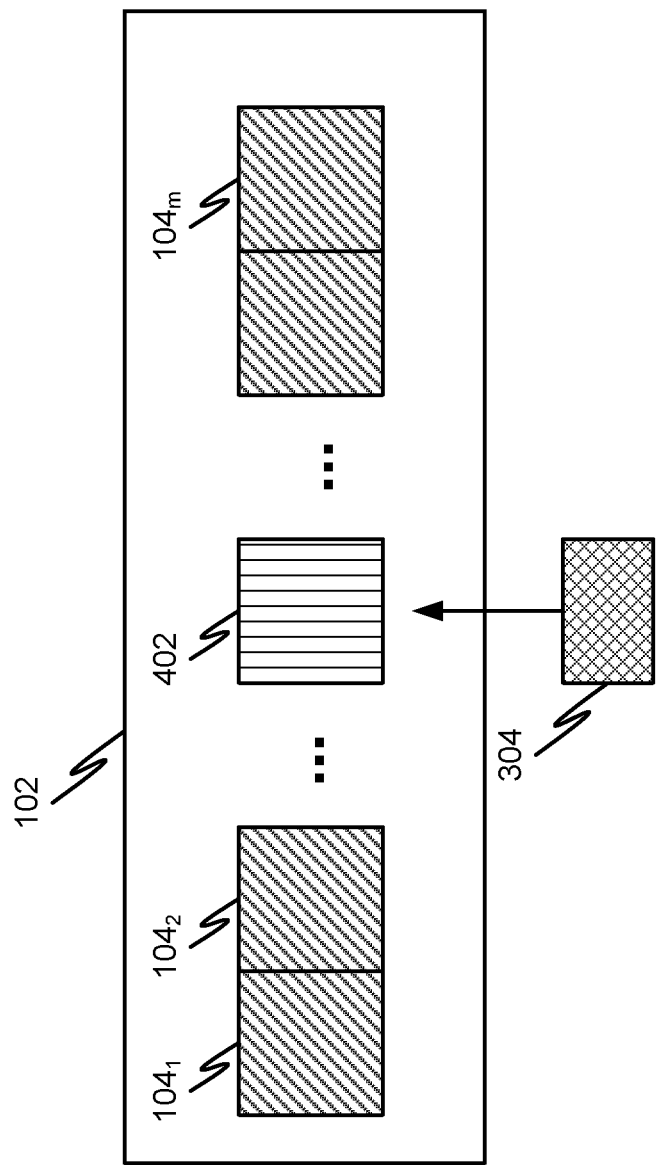

The cache-management component 106 may search for a cache line in the cache 102 that has already been assigned to the ring $108_k$. If a cache line that has been assigned to the ring $108_k$ is located, the cache-management component 106 stores the pre-fetched TRBs to the cache line previously assigned to the ring $108_k$. If no cache line has been assigned to the ring $108_k$, the cache-management component 106 may search for an empty cache line which does not include any valid TRBs. For example, all TRBs in the empty cache line are invalid. As shown in FIG. 3, the empty cache line 302 is located, and the cache-management component 106 assigns the empty cache line 302 to the ring $108_k$ and stores the pre-fetched TRBs 304 to the empty cache line 302. For example, a hit rate associated with storing the pre-fetched TRBs to the empty cache line is approximately 100%.

Figure 5:
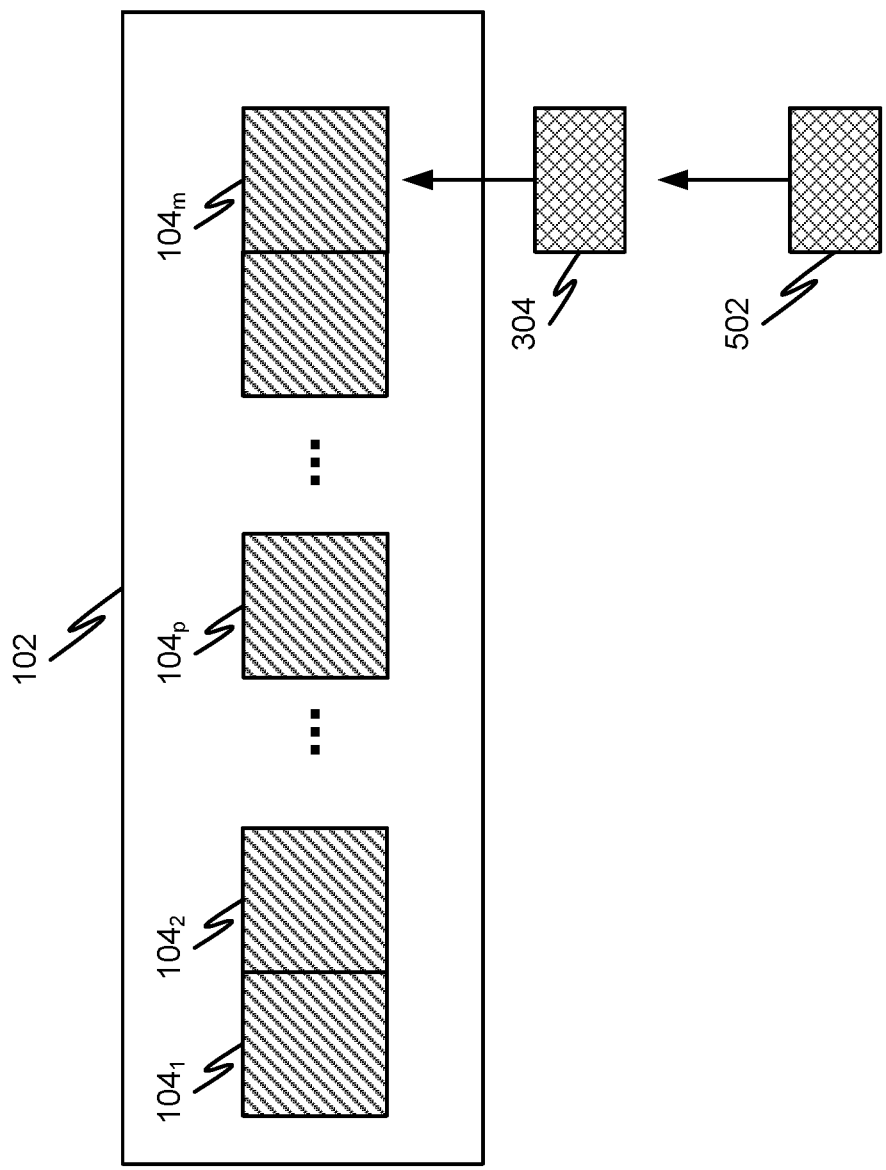

If no empty cache line is located in the cache 102, the cache-management component 106 may assign a predetermined cache line 402 to the ring $108_k$ and store the pre-fetched TRBs 304 to the predetermined cache line 402. In certain embodiments, the predetermined cache line may be a control cache line corresponding to a control endpoint which is used for control transfer related to command or status operations. In some embodiments, the predetermined cache line corresponds to a most-recently-used cache line that has been accessed recently. As shown in FIG. 5, the cache line $104_m$ is determined to be the most-recently-used cache line, and then the cache-management component 106 assigns the cache line $104_m$ to the ring $108_k$ and stores the pre-fetched TRBs 304 to the cache line $104_m$. In addition, the cache-management component 106 pre-fetches one or more TRBs 502 from another ring, and determines the cache line $104_m$ corresponds to the most-recently-used cache line. Thus, the cache-management component 106 stores the pre-fetched TRBs 502 to the cache line $104_m$ to replace the TRBs 304 previously stored in the cache line $104_m$. For example, if there are 100 rings in the host memory and 32 cache lines in the cache 102, a hit rate associated with storing pre-fetched TRBs to a predetermined cache line is approximately 31/100.

Figure 6:
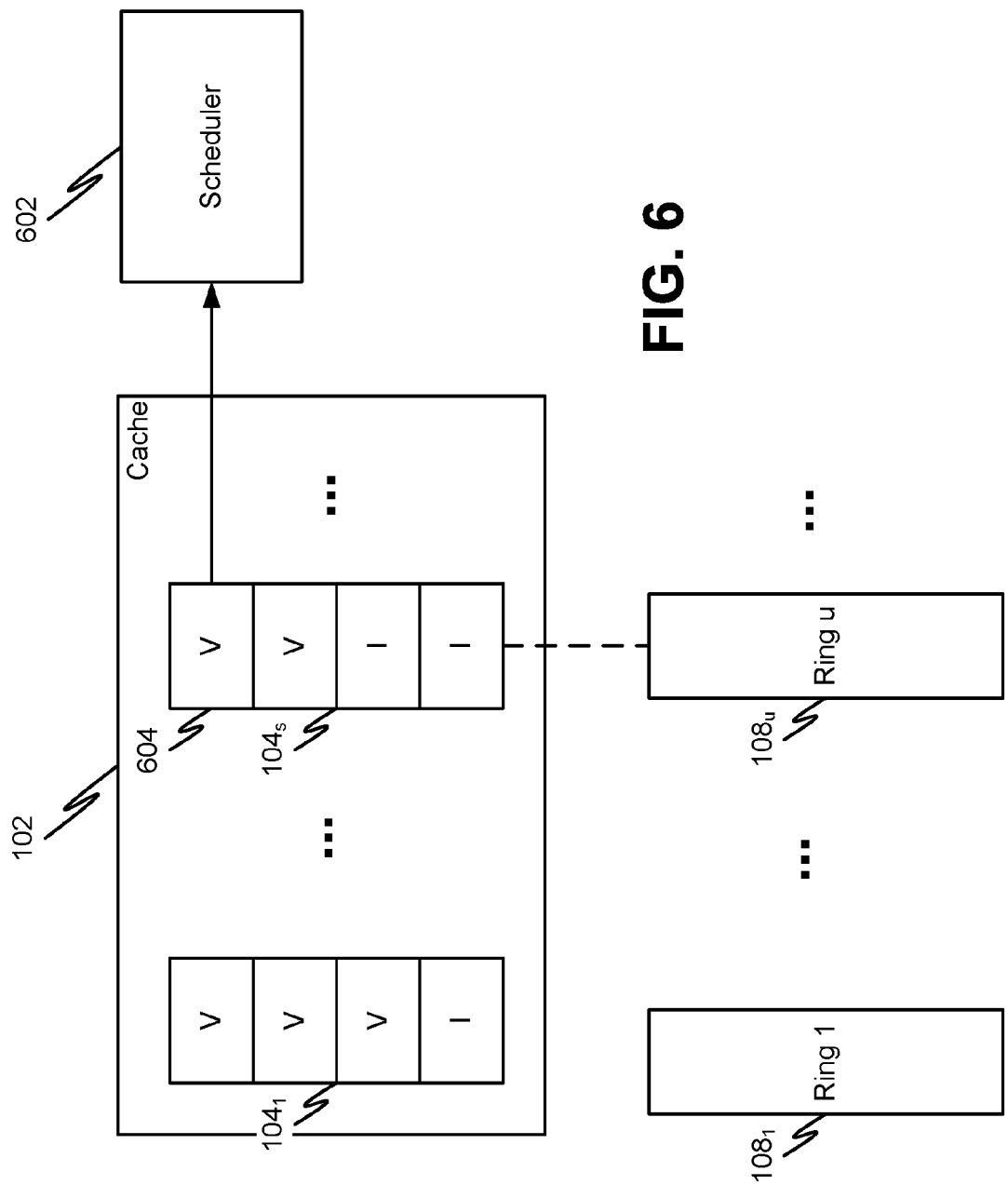
FIG. 6 depicts an example diagram showing a scheduler retrieving a TRB from a cache.

FIG. 6 depicts an example diagram showing a scheduler retrieving a TRB from the cache 102. As shown in FIG. 6, the scheduler 602 requests a TRB of a ring $108_u$. A cache line $104_s$ in the cache 102 has been assigned to the ring $108_u$, and one or more TRBs have been pre-fetched from the ring $108_u$ and stored in the cache line $104_s$. As shown in FIG. 6, the cache line $104_s$ includes two valid TRBs and two invalid TRBs. A single valid TRB 604 is retrieved from the cache line $104_s$ and sent to the scheduler 602 for data transfer involving a device endpoint that corresponds to the ring $108_u$.

Figure 7A:
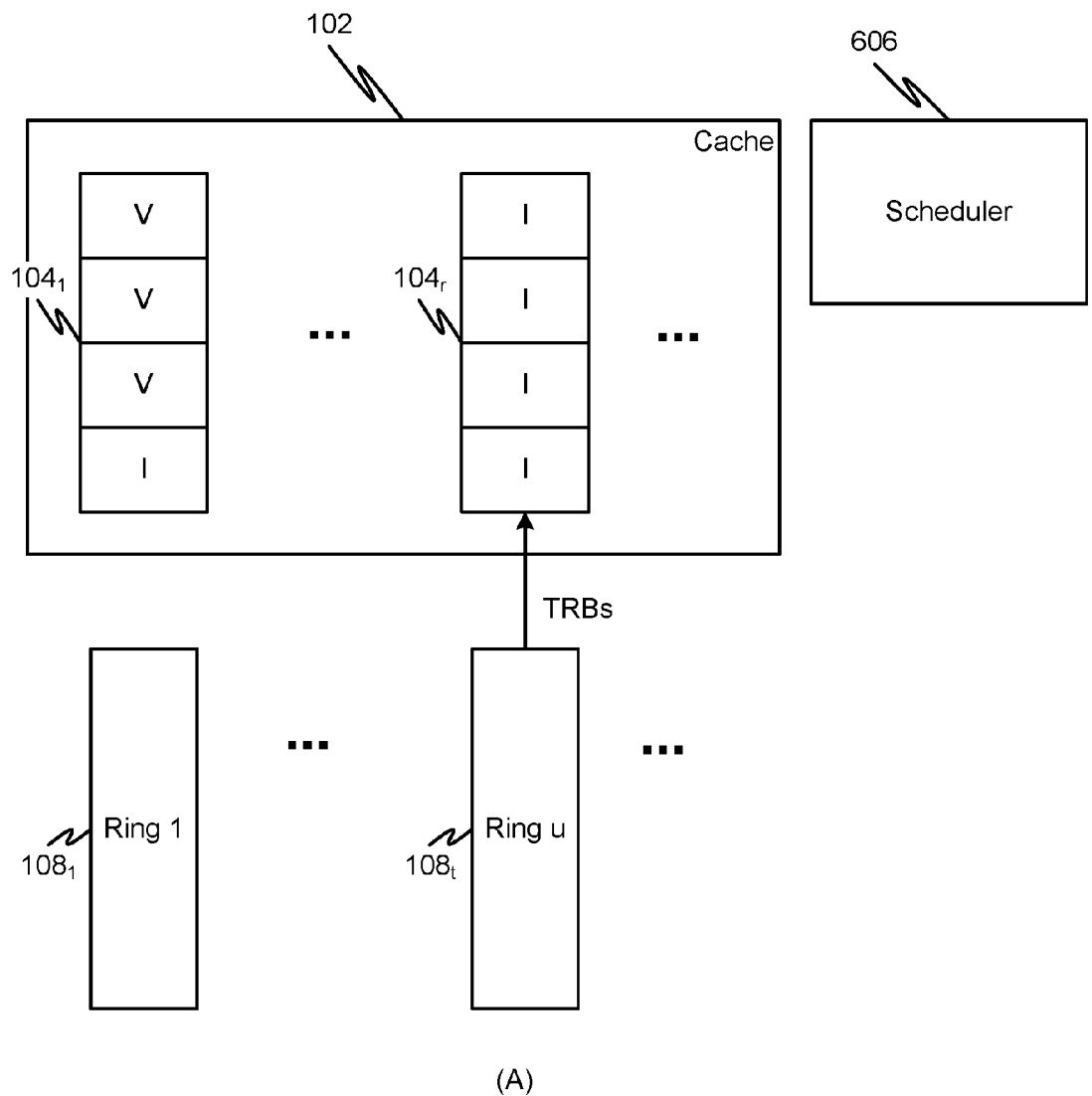
FIG. 7(A) and FIG. 7(B) depict other example diagrams showing a scheduler retrieving a TRB from a cache.
Figure 7B:
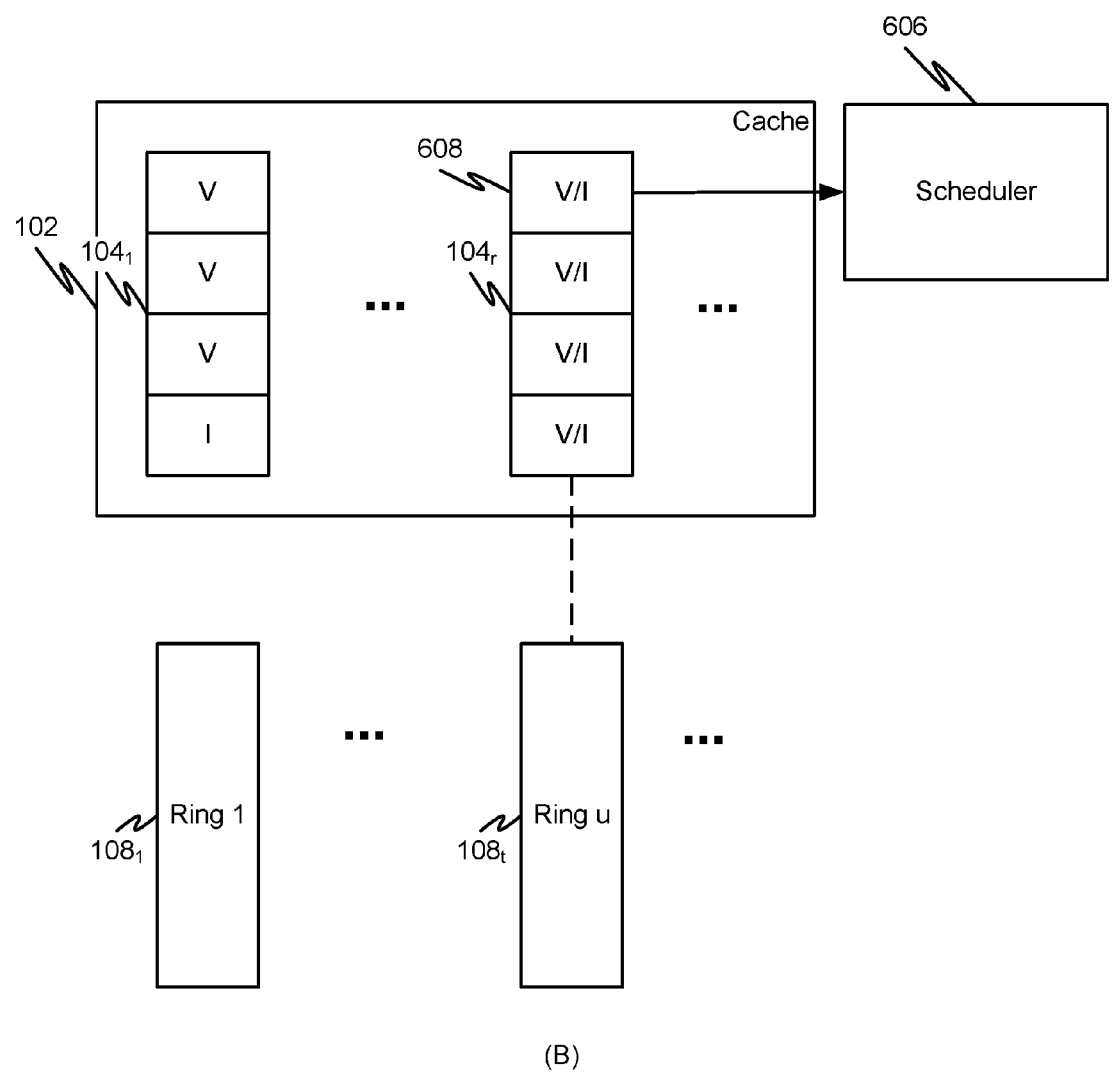

FIG. 7(A) and FIG. 7(B) depict other example diagrams showing a scheduler retrieving a TRB from the cache 102. As shown in FIG. 7(A), the scheduler 606 requests a TRB of a ring $108_t$, and a cache line $104_r$ in the cache 102 has been assigned to the ring $108_t$. However, the TRBs contained in the cache line $104_r$ are all invalid. That is, the cache line $104_r$ corresponds to an empty cache line. One or more TRBs (e.g., four TRBs) can be fetched from the ring $108_t$ and stored in the cache line $104_r$. As shown in FIG. 7(B), a single TRB 608 (e.g., valid or invalid) is then retrieved from the cache line $104_r$ and sent to the scheduler 606 for data transfer involving a device endpoint that corresponds to the ring $108_t$.

Figure 8:
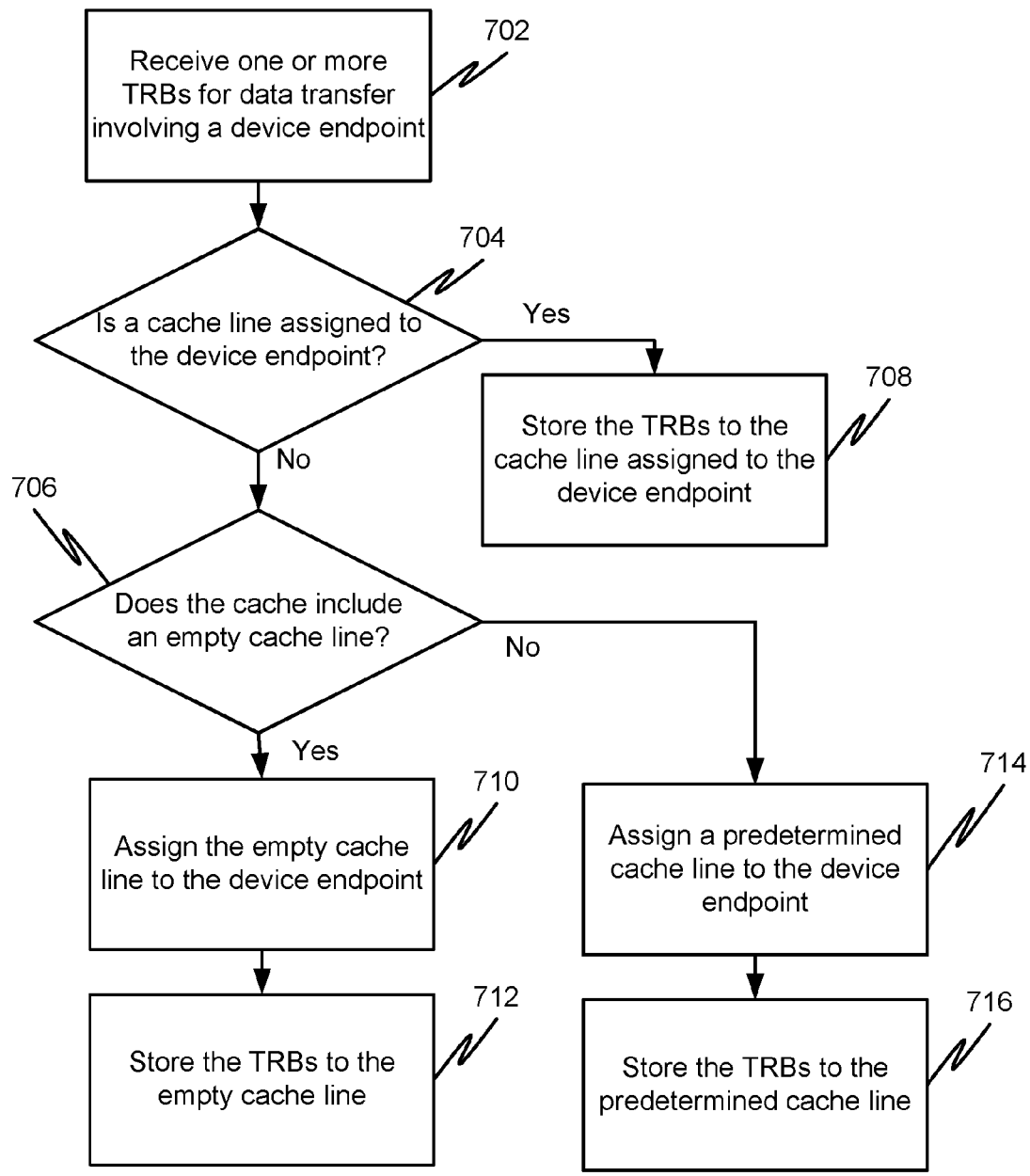
FIG. 8 depicts an example flow diagram for cache management.

FIG. 8 depicts an example diagram showing a method for cache management. At 702, one or more transfer request blocks (TRBs) for data transfer involving a device endpoint. The device endpoint includes a portion of a universal-serial-bus (USB) device. At 704, whether a cache line in a cache is assigned to the device endpoint is determined. The cache includes a plurality of cache lines corresponding to a plurality of device endpoints. If a cache line assigned to the device endpoint is located, at 708, the one or more first TRBs are stored to the cache line assigned to the device endpoint. If no cache line has been assigned to the device endpoint, at 706, whether the cache includes an empty cache line that contains no valid TRBs is determined. If the cache includes an empty cache line, at 710, the empty cache line is assigned to the first device endpoint. At 712, the one or more first TRBs are stored to the empty cache line. If the cache does not include an empty cache line, at 714, a predetermined cache line is assigned to the first device endpoint. At 716, the one or more first TRBs are stored to the predetermined cache line.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A system for cache management, the system comprising:
   a cache including a plurality of cache lines corresponding to a plurality of device endpoints, a device endpoint including a portion of a universal-serial-bus (USB) device; and
   a cache-management component configured to:
      receive one or more first transfer request blocks (TRBs) for data transfer involving a first device endpoint;
      determine whether a cache line in the cache is assigned to the first device endpoint;
      in response to no cache line in the cache being assigned to the first device endpoint, determine whether the cache includes an empty cache line that contains no valid TRBs;
      in response to the cache including an empty cache line, assign the empty cache line to the first device endpoint; and
         store the one or more first TRBs to the empty cache line; and
      in response to the cache not including an empty cache line,
         assign, to the first device endpoint, a last cache line that includes a most recently received TRB in the cache; and
         store the one or more first TRBs to the last cache line;
      wherein the last cache line that includes the most recently received TRB corresponds to a control cache line that (i) is previously assigned to a control endpoint and (ii) corresponds to a control endpoint used for control transfer related to command and status operations.

2. The system of claim 1, wherein the cache-management component is further configured to:
   receive one or more second TRBs for data transfer involving a second device endpoint;
   determine whether a cache line in the cache is assigned to the second device endpoint;
   in response to no cache line being assigned to the second device endpoint, determine whether the cache includes an empty cache line;
   in response to the cache including an empty cache line, assign the empty cache line to the second device endpoint; and
      store the one or more second TRBs to the empty cache line;
   in response to the cache not including an empty cache line,
      assign the last cache line to the second device endpoint; and
      store the one or more second TRBs to the last cache line to replace the first TRBs;
   receive the first TRBs from a first TRB ring associated with the first device endpoint; and
   receive the second TRBs from a second TRB ring associated with the second device endpoint.

3. The system of claim 1, further comprising:
   a scheduler configured to retrieve the one or more first TRBs from the cache for data transfer involving the first device endpoint.

4. The system of claim 1, wherein the cache-management component is further configured to, in response to a first cache line assigned to the first device endpoint being located, store the one or more first TRBs to the first cache line.

5. The system of claim 4, wherein the cache-management component is further configured to store the one or more first TRBs to the first cache line to replace one or more second TRBs previously stored in the first cache line.

6. The system of claim 1, wherein the storing, of the one or more first TRBs to the last cache line that includes the one or more most recently received TRBs, replaces the one or more recently received TRBs.

7. A method comprising:
   receiving one or more first transfer request blocks (TRBs) for data transfer involving a first device endpoint, the first device endpoint including a portion of a first universal-serial-bus (USB) device;
   determining whether a cache line in a cache is assigned to the first device endpoint, the cache including a plurality of cache lines corresponding to a plurality of device endpoints;
   in response to no cache line being assigned to the first device endpoint, determining whether the cache includes an empty cache line that contains no valid TRBs;
   in response to the cache including an empty cache line, assigning the empty cache line to the first device endpoint; and
      storing the one or more first TRBs to the empty cache line;
   in response to the cache not including an empty cache line,
      assigning, to the first device endpoint, a last cache line that includes a most recently received TRB in the cache; and
      storing the one or more first TRBs to the last cache line;
   wherein the last cache line that includes the most recently received TRB corresponds to a control cache line that (i) is previously assigned to a control endpoint and (ii) corresponds to a control endpoint used for control transfer related to command and status operations.

8. The method of claim 7, further comprising:
   receiving one or more second TRBs for data transfer involving a second device endpoint;
   determining whether a cache line in the cache is assigned to the second device endpoint;
   in response to no cache line in the cache being assigned to the second device endpoint, determining whether the cache includes an empty cache line;
   in response to the cache including an empty cache line, assigning the empty cache line to the second device endpoint; and
      storing the one or more second TRBs to the empty cache line;
   in response to the cache not including an empty cache line,
      assigning the last cache line to the second device endpoint; and
      storing the one or more second TRBs to the last cache line to replace the first TRBs;
   receiving the first TRBs from a first TRB ring associated with the first device endpoint; and
   receiving the second TRBs from a second TRB ring associated with the second device endpoint.

9. The method of claim 7, further comprising:
   retrieving the one or more first TRBs from the cache for data transfer involving the first device endpoint.

10. The method of claim 7, further comprising:
   in response to a first cache line assigned to the first device endpoint being located, storing the one or more first TRBs to the first cache line.

11. The method of claim 10, wherein the one or more first TRBs are stored to the first cache line to replace one or more second TRBs previously stored in the first cache line.

12. The method of claim 7, wherein the storing, of the one or more first TRBs to the last cache line that includes the most recently-received TRB, replaces the most recently-received TRB.

13. A non-transitory computer readable storage medium comprising programming instructions for cache management, the programming instructions configured to cause one or more data processors to execute operations comprising:
    receiving one or more first transfer request blocks (TRBs) for data transfer involving a first device endpoint, the first device endpoint including a portion of a first universal-serial-bus (USB) device;
    determining whether a cache line in a cache is assigned to the first device endpoint, the cache including a plurality of cache lines corresponding to a plurality of device endpoints;
    in response to no cache line being assigned to the first device endpoint, determining whether the cache includes an empty cache line that contains no valid TRBs;
    in response to the cache including an empty cache line, assigning the empty cache line to the first device endpoint;
    storing the one or more first TRBs to the empty cache line;
    in response to the cache not including an empty cache line,
        assigning, to the first device endpoint, a last cache line that includes a most recently received TRB in the cache; and
        storing the one or more first TRBs to the last cache line;
    wherein the last cache line that includes the most recently received TRB corresponds to a control cache line that (i) is previously assigned to a control endpoint and (ii) corresponds to a control endpoint used for control transfer related to command and status operations.

14. The storage medium of claim 13, wherein the programming instructions are configured to cause the data processors to execute further operations including:
    receiving one or more second TRBs for data transfer involving a second device endpoint;
    determining whether a cache line in the cache is assigned to the second device endpoint;
    in response to no cache line in the cache being assigned to the second device endpoint, determining whether the cache includes an empty cache line;
    in response to the cache including an empty cache line, assigning the empty cache line to the second device endpoint; and
        storing the one or more second TRBs to the empty cache line; and
    in response to the cache not including an empty cache line,
        assigning the last cache line to the second device endpoint; and
        storing the one or more second TRBs to the last cache line to replace the first TRBs;
    receiving the first TRBs from a first TRB ring associated with the first device endpoint; and
    receiving the second TRBs from a second TRB ring associated with the second device endpoint.

15. The storage medium of claim 13, wherein the programming instructions are configured to cause the data processors to execute further operations including:
    retrieving the one or more first TRBs from the cache for data transfer involving the first device endpoint.

16. The storage medium of claim 13, wherein the programming instructions are configured to cause the data processors to execute further operations including:
    in response to a first cache line assigned to the first device endpoint being located, storing the one or more first TRBs to the first cache line.

17. The storage medium of claim 16, wherein the one or more first TRBs are stored to the first cache line to replace one or more second TRBs previously stored in the first cache line.

18. The storage medium of claim 13, wherein the storing, of the one or more first TRBs to the last cache line that includes the most recently-received TRB, replaces the most recently-received TRB.

* * * * *